(12) United States Patent
Fütterer et al.

(10) Patent No.: US 7,608,571 B2
(45) Date of Patent: Oct. 27, 2009

(54) METHOD FOR RECOVERING CRUDE OIL FROM A SUBTERRANEAN FORMATION UTILIZING A POLYPHOSPHATE ESTER

(75) Inventors: Tobias Johannes Fütterer, Singapore (SG); Lawrence Alan Hough, Philadelphia, PA (US); Robert Lee Reierson, Princeton Junction, NJ (US)

(73) Assignee: Rhodia Inc., Cranbury, NJ (US)

( * ) Notice: Subject to any disclaimer, the term of this patent is extended or adjusted under 35 U.S.C. 154(b) by 0 days.

(21) Appl. No.: 12/137,823

(22) Filed: Jun. 12, 2008

(65) Prior Publication Data

US 2009/0023618 A1 Jan. 22, 2009

Related U.S. Application Data

(60) Provisional application No. 60/929,979, filed on Jul. 20, 2007.

(51) Int. Cl.
*C11D 3/36* (2006.01)
(52) U.S. Cl. .................. 510/188; 510/431; 510/436; 510/467; 166/270; 166/270.1; 166/272.6; 166/275; 166/304; 166/312
(58) Field of Classification Search ............ 510/188, 510/431, 436, 467; 166/270, 270.1, 272.6, 166/275, 304, 312
See application file for complete search history.

(56) References Cited

U.S. PATENT DOCUMENTS

| | | | |
|---|---|---|---|
| 2,438,091 A | 3/1948 | Lynch | |
| 2,524,218 A | 10/1950 | Bersworth | |
| 2,528,378 A | 10/1950 | Mannheimer | |
| 2,530,147 A | 11/1950 | Bersworth | |
| 2,658,072 A | 11/1953 | Kosmin | |
| 2,826,551 A | 3/1958 | Geen | |
| 2,874,074 A | 2/1959 | Johnson | |
| 2,946,725 A | 7/1960 | Norris et al. | |
| 3,033,704 A | 5/1962 | Sherrill et al. | |
| 3,070,510 A | 12/1962 | Cooley et al. | |
| 3,244,724 A | 4/1966 | Guttmann | |
| 3,308,067 A | 3/1967 | Diehl | |
| 3,332,880 A | 7/1967 | Kessler et al. | |
| 3,538,230 A | 11/1970 | Pader et al. | |
| 3,553,139 A | 1/1971 | McCarty | |
| 3,598,865 A | 8/1971 | Lew | |
| 3,599,716 A * | 8/1971 | Thompson | 166/270.1 |
| 3,678,154 A | 7/1972 | Widder et al. | |
| 3,681,241 A | 8/1972 | Rudy | |
| 3,717,630 A | 2/1973 | Booth | |
| 3,723,322 A | 3/1973 | Diehl | |
| 3,793,209 A * | 2/1974 | Thompson | 507/235 |
| 3,850,831 A | 11/1974 | Helisten et al. | |
| 3,862,307 A | 1/1975 | Di Giulio | |
| 3,869,412 A | 3/1975 | Waag | |
| 3,893,929 A | 7/1975 | Basadur | |
| 3,912,681 A | 10/1975 | Dickson | |
| 3,939,911 A | 2/1976 | Maddox, Jr. et al. | |
| 3,948,838 A | 4/1976 | Hinton, Jr. et al. | |
| 3,956,198 A | 5/1976 | Bauer | |
| 3,959,230 A | 5/1976 | Hays | |
| 3,959,458 A | 5/1976 | Agricola et al. | |
| 3,964,500 A | 6/1976 | Drakoff | |
| 3,976,586 A | 8/1976 | Chakrabarti | |
| 4,001,133 A | 1/1977 | Sorgenfrei et al. | |
| 4,008,165 A | 2/1977 | Maddox, Jr. et al. | |
| 4,017,410 A | 4/1977 | Sorgenfrei et al. | |
| 4,038,027 A | 7/1977 | Kearney | |
| 4,049,558 A | 9/1977 | Rasmussen | |
| 4,051,234 A | 9/1977 | Gieske et al. | |
| 4,101,457 A | 7/1978 | Place et al. | |
| 4,116,984 A | 9/1978 | Prinzbach et al. | |
| 4,127,489 A | 11/1978 | Pracht et al. | |
| 4,144,226 A | 3/1979 | Crutchfield et al. | |
| 4,146,495 A | 3/1979 | Crutchfield et al. | |
| 4,152,416 A | 5/1979 | Spitzer et al. | |
| 4,152,421 A | 5/1979 | Tsutsumi et al. | |
| 4,206,215 A | 6/1980 | Bailey | |
| 4,235,735 A | 11/1980 | Marco et al. | |
| 4,240,919 A | 12/1980 | Chapman | |
| 4,261,868 A | 4/1981 | Hora et al. | |
| 4,264,580 A | 4/1981 | Barberio | |
| 4,278,129 A * | 7/1981 | Walton | 166/270.1 |
| 4,287,080 A | 9/1981 | Siklosi | |
| 4,321,256 A | 3/1982 | Hasegawa et al. | |
| 4,350,680 A | 9/1982 | Harvey et al. | |
| 4,364,837 A | 12/1982 | Pader | |
| 4,391,722 A | 7/1983 | Schwartz et al. | |
| 4,393,935 A * | 7/1983 | Walton | 166/270.1 |
| 4,470,923 A | 9/1984 | Koster | |
| 4,483,779 A | 11/1984 | Llenado et al. | |
| 4,507,219 A | 3/1985 | Hughes | |
| 4,525,291 A | 6/1985 | Smith et al. | |
| 4,536,317 A | 8/1985 | Llenado et al. | |
| 4,536,318 A | 8/1985 | Cook et al. | |
| 4,536,319 A | 8/1985 | Payne | |
| 4,541,483 A * | 9/1985 | Walton | 166/270.2 |

(Continued)

FOREIGN PATENT DOCUMENTS

DE 2829022 1/1980

(Continued)

OTHER PUBLICATIONS

U.S. Appl. No. 12/137,589 "Mono-, Di- and Polyol Phosphate Esters in Personal Care Formulations", Futterer et al., filed Jun. 12, 2008.

(Continued)

*Primary Examiner*—Charles I Boyer
(74) *Attorney, Agent, or Firm*—Novak Druce + Quigg LLP

(57) ABSTRACT

An aqueous fluid useful for the recovery of crude oil from a subterranean formation, including water and one or more organophosphorus materials and methods for using same.

30 Claims, 2 Drawing Sheets

U.S. PATENT DOCUMENTS

| | | | |
|---|---|---|---|
| 4,548,744 A | 10/1985 | Connor | |
| 4,557,853 A | 12/1985 | Collins | |
| 4,559,056 A | 12/1985 | Leigh et al. | |
| 4,565,647 A | 1/1986 | Llenado | |
| 4,579,681 A | 4/1986 | Ruppert et al. | |
| 4,597,898 A | 7/1986 | Vander Meer | |
| 4,599,188 A | 7/1986 | Llenado | |
| 4,614,519 A | 9/1986 | Ruppert et al. | |
| 4,627,977 A | 12/1986 | Gaffar et al. | |
| 4,664,839 A | 5/1987 | Rieck | |
| 4,702,857 A | 10/1987 | Gosselink | |
| 4,711,730 A | 12/1987 | Gosselink et al. | |
| 4,721,580 A | 1/1988 | Gosselink | |
| 4,728,455 A | 3/1988 | Rerek | |
| 4,734,099 A | 3/1988 | Cyprien | |
| 4,746,456 A | 5/1988 | Kud et al. | |
| 4,752,409 A | 6/1988 | Drapier et al. | |
| 4,770,666 A | 9/1988 | Clauss | |
| 4,801,395 A | 1/1989 | Chazard et al. | |
| 4,813,482 A * | 3/1989 | Walton | 166/267 |
| 4,836,949 A | 6/1989 | Klajnscek | |
| 4,859,358 A | 8/1989 | Gabriel et al. | |
| 4,877,896 A | 10/1989 | Maldonado et al. | |
| 4,886,609 A * | 12/1989 | Walton | 507/238 |
| 4,891,160 A | 1/1990 | Vander Meer | |
| 4,894,220 A | 1/1990 | Nabi et al. | |
| 4,902,499 A | 2/1990 | Bolish, Jr. et al. | |
| 4,933,101 A | 6/1990 | Cilley et al. | |
| 4,968,451 A | 11/1990 | Scheibel et al. | |
| 4,976,879 A | 12/1990 | Maldonado et al. | |
| 5,015,466 A | 5/1991 | Parran, Jr. et al. | |
| 5,019,373 A | 5/1991 | Carter et al. | |
| 5,038,864 A * | 8/1991 | Dunleavy et al. | 166/300 |
| 5,064,553 A | 11/1991 | Dixit et al. | |
| 5,098,590 A | 3/1992 | Dixit et al. | |
| 5,104,643 A | 4/1992 | Grollier et al. | |
| 5,114,606 A | 5/1992 | van Vliet et al. | |
| 5,130,043 A | 7/1992 | Prince et al. | |
| 5,160,450 A | 11/1992 | Okahara et al. | |
| 5,236,615 A | 8/1993 | Trinh et al. | |
| 5,280,117 A | 1/1994 | Kerschner et al. | |
| 5,332,528 A | 7/1994 | Pan et al. | |
| 5,370,865 A | 12/1994 | Yamagishi et al. | |
| 5,405,542 A | 4/1995 | Trinh et al. | |
| 5,413,727 A | 5/1995 | Drapier et al. | |
| 5,415,807 A | 5/1995 | Gosselink et al. | |
| 5,415,860 A | 5/1995 | Beucherie et al. | |
| 5,510,042 A | 4/1996 | Hartman et al. | |
| 5,510,306 A | 4/1996 | Murray | |
| 5,534,197 A | 7/1996 | Scheibel et al. | |
| 5,550,274 A | 8/1996 | Reierson | |
| 5,554,781 A | 9/1996 | Reierson | |
| 5,559,261 A | 9/1996 | Sivik | |
| 5,565,145 A | 10/1996 | Watson et al. | |
| 5,573,709 A | 11/1996 | Wells | |
| 5,607,680 A | 3/1997 | Brissonnet et al. | |
| 5,648,584 A | 7/1997 | Murray | |
| 5,648,585 A | 7/1997 | Murray et al. | |
| 5,686,024 A | 11/1997 | Dahanayake et al. | |
| 5,710,121 A | 1/1998 | Tracy et al. | |
| 5,798,326 A | 8/1998 | Goldstein et al. | |
| 5,804,542 A | 9/1998 | Scheper et al. | |
| 5,824,289 A | 10/1998 | Stoltz | |
| 5,849,960 A | 12/1998 | Singleton et al. | |
| 5,853,710 A | 12/1998 | Dehan et al. | |
| 5,858,343 A | 1/1999 | Szymczak | |
| 5,879,469 A | 3/1999 | Avram | |
| 5,902,574 A | 5/1999 | Stoner et al. | |
| 5,902,778 A | 5/1999 | Hartmann et al. | |
| 5,939,052 A | 8/1999 | White, Jr. et al. | |
| 5,968,893 A | 10/1999 | Manohar et al. | |
| 6,017,936 A | 1/2000 | Polson et al. | |
| 6,136,221 A | 10/2000 | Reierson | |
| 6,149,693 A | 11/2000 | Geib | |
| 6,150,222 A | 11/2000 | Gardner et al. | |
| 6,187,391 B1 | 2/2001 | Kataoka et al. | |
| 6,220,352 B1 * | 4/2001 | Walton | 166/263 |
| 6,222,077 B1 | 4/2001 | Singleton | |
| 6,242,404 B1 | 6/2001 | Dahanayake et al. | |
| 6,271,409 B1 | 8/2001 | Geib | |
| 6,297,201 B1 | 10/2001 | Geib | |
| 6,342,468 B1 | 1/2002 | Geib | |
| 6,387,137 B1 | 5/2002 | Geib | |
| 6,525,005 B1 | 2/2003 | Kravitz et al. | |
| 6,566,313 B1 | 5/2003 | Hohenstein et al. | |
| 6,569,261 B1 | 5/2003 | Aubay et al. | |
| 6,579,466 B1 | 6/2003 | David et al. | |
| 6,593,288 B2 | 7/2003 | Aubay et al. | |
| 6,767,410 B2 | 7/2004 | Aubay et al. | |
| 6,767,560 B2 | 7/2004 | Paek | |
| 6,864,314 B1 | 3/2005 | Yeung et al. | |
| 6,924,260 B2 | 8/2005 | Aubay | |
| 7,262,153 B2 | 8/2007 | Shpakoff et al. | |
| 7,381,695 B2 | 6/2008 | Minevski | |
| 2003/0044469 A1 | 3/2003 | Viladot Petit et al. | |
| 2003/0228339 A1 | 12/2003 | El-Nokaly et al. | |
| 2004/0185027 A1 | 9/2004 | Reierson et al. | |
| 2004/0247534 A1 | 12/2004 | Stoltz | |
| 2005/0020466 A1 | 1/2005 | Man et al. | |
| 2005/0184273 A1 | 8/2005 | Morelli et al. | |
| 2006/0088482 A1 | 4/2006 | Wulknitz et al. | |
| 2006/0093559 A1 | 5/2006 | Fabry | |
| 2006/0135384 A1 | 6/2006 | Luu et al. | |
| 2006/0159631 A1 | 7/2006 | Buch et al. | |
| 2006/0217286 A1 | 9/2006 | Geoffroy et al. | |
| 2007/0145617 A1 | 6/2007 | Finney et al. | |
| 2007/0166243 A1 | 7/2007 | Yoshida et al. | |
| 2008/0028986 A1 | 2/2008 | Futterer et al. | |
| 2008/0095719 A1 | 4/2008 | Herrmann et al. | |
| 2008/0220031 A1 | 9/2008 | Wunsch et al. | |

FOREIGN PATENT DOCUMENTS

| | | |
|---|---|---|
| EP | 0011984 | 6/1980 |
| EP | 0066915 | 12/1982 |
| EP | 0132043 | 1/1985 |
| EP | 0132046 | 1/1985 |
| EP | 0219048 | 4/1987 |
| EP | 0488868 | 6/1992 |
| EP | 0561656 | 9/1993 |
| EP | 0909809 | 4/1999 |
| EP | 1196523 | 4/2002 |
| EP | 1196527 | 4/2002 |
| EP | 1196528 | 4/2002 |
| FR | 2236926 | 2/1975 |
| FR | 2334698 | 7/1977 |
| GB | 849433 | 9/1960 |
| GB | 1314897 | 4/1973 |
| GB | 1475798 | 6/1977 |
| GB | 1498520 | 1/1978 |
| GB | 1537288 | 12/1978 |
| GB | 1578930 | 11/1980 |
| GB | 2 192 194 A | 1/1988 |
| GB | 2 283 036 A | 4/1995 |
| GB | 2 283 755 A | 5/1995 |
| JP | 3157323 A1 | 7/1991 |
| JP | 047547 | 1/1992 |
| JP | 6313271 | 11/1994 |
| JP | 2003342140 A | 12/2003 |
| JP | 2005-013929 | 1/2005 |
| WO | 9532272 | 11/1995 |
| WO | 9532997 | 12/1995 |
| WO | 9623859 | 8/1996 |
| WO | 9623860 | 8/1996 |

| WO | 9623861 | 8/1996 |
| WO | 97/42287 A1 | 11/1997 |
| WO | 9742288 | 11/1997 |
| WO | 9838973 | 9/1998 |
| WO | 9841505 | 9/1998 |
| WO | 2004/082500 A2 | 9/2004 |

OTHER PUBLICATIONS

U.S. Appl. No. 12/137,647 "Mono-, Di- and Polyol Alkoxylate Phosphate Esters in Oral Care Formulations and Methods for Using Same", Futterer et al., filed Jun. 12, 2008.

U.S. Appl. No. 12/137,738 "Hard Surface Cleaning Composition with Hydrophilizing Agent and Method for Cleaning Hard Surfaces", Futterer et al., filed Jun. 12, 2008.

U.S. Appl. No. 12/138,030 "Detergent Composition with Hydrophilizing Soil-Release Agent and Methods for Using Same" Futterer et al., filed Jun. 12, 2008.

Office Action mailed Oct. 03, 2008 in U.S. Appl. No. 12/138,030.

Office Action mailed Oct. 03, 2008 in U.S. Appl. No. 12/137,647.

Notice of Allowance mailed Oct. 29, 2008 in U.S. Appl. No. 12/137,589.

Notice of Allowance mailed Nov. 13, 2008 in U.S. Appl. No. 12/137,738.

* cited by examiner

CaCO3 Crystal / Pure DI Water / Hexadecane

CaCO3 Crystal / DI Water + PEG1000PE / Hexadecane

METHOD FOR RECOVERING CRUDE OIL FROM A SUBTERRANEAN FORMATION UTILIZING A POLYPHOSPHATE ESTER

CROSS REFERENCE TO RELATED APPLICATIONS

This claims the benefit of U.S. Provisional Patent Application No. 60/929,979 filed Jul. 20, 2007 and is incorporated by reference in its entirety.

FIELD OF THE INVENTION

This invention relates to a method for recovering crude oil from a subterranean formation.

BACKGROUND OF THE INVENTION

A variety of methods are used for recovering crude oil from subterranean formations. Initially, oil is produced from a formation by pressure depletion. In this method, the differential pressure between the formation and a production well or wells forces the oil contained within the formation toward a production well where it can be recovered. Typically, up to about 35 percent of the oil which is initially contained in a formation can be recovered using pressure depletion. This leaves a large quantity of oil within the formation. Additionally, some formations contain oil which is too viscous to be efficiently recovered from the formation using pressure depletion methods. Because of the need to recover a larger percentage of the oil from a formation, methods have been developed recover oil which could not be recovered using only pressure depletion techniques. These methods are typically referred to as "enhanced oil recovery techniques".

Previous oil production methods leave as much as 50% of the original oil in place. Recent efforts to recover that oil remaining in the reservoirs have had considerable success. Among the more promising of the methods being used today is an enhanced oil recovery process referred to as a surfactant flood.

An aqueous fluid containing surfactant is injected into an oil rich formation to displace oil from the formation and the displaced oil is then recovered.

In oil-wet formations, such as carbonate rock formations, the hydrophobic surface of the formation limits imbibition of aqueous fluid into the formation and thus limits the amount of oil that can be displaced by the flooding method.

Most of the carbonate reservoirs are naturally fractured and recovery from these reservoirs is typically much lower than that from unfractured reservoirs. According to a recent review of 100 fractured reservoirs, Enhanced Oil Recovery (EOR) technique is requested to achieve maximum production of such reservoirs with high matrix porosity and low matrix permeability. The wettability of originally water-wet carbonate reservoirs is altered by the adsorption of polar compounds and/or deposition of organic matter that was originally in the crude oil and many carbonate reservoirs are thus mixed-wet or oil-wet. Although it is difficult to identify precisely which compounds are critical in altering the wettability of the reservoir it has been suggested that asphaltene, naphtenic acid and a number of carboxylic acids including caprylic, palmitic, stearic and oleic were the main cause. These natural surfactants in crude oil are sufficiently soluble in water to pass through a thin layer of water and adsorb onto the rock surface. The main difference between silica and calcite is that the point of zero charge for the calcite is approximately 8.2 and thus surface of calcite is positively charged at neutral pH. If rocks are oil-wet or mixed-wet, spontaneous imbibition does not occur. The use of surfactant to alter the rock surface to increase water-wetness, decrease interfacial tension and promote imbibition of water into the matrix reservoir has been proposed to improve oil recovery. However, the use of surfactants is not always satisfactory in carbonate formations.

The main mechanisms to improve recovery in oil-wet formations are: wettability alteration and wettability alteration and interfacial tension reduction With respect to the wettability alteration two different strategies can be considered: Such strategies relate to chemical compounds that will adsorb directly on the organic carboxylates deposited on the carbonate surface of the reservoir and will increase the hydrophilicity of the surface and chemical compounds that will desorb the adsorbed organic carboxylates and render the surface more hydrophilic.

To reach the solid-liquid interface, diffusion through the water-oil interface and then through the oil phase represents the only transport mechanism. This suggests that small and non associated molecules are probably better candidates compare to larger macromolecules.

In general anionic surfactants are not able to desorb organic carboxylates adsorbed to a chalk surface.

Cationic surfactants of the type R—N+(CH$_3$)$_3$ are able to desorb organic carboxylates from the chalk surface in an irreversible way and 70% of the oil in place can, in certain circumstances, be recovered within 30 days by spontaneous imbibition of the aqueous surfactant solution at 70° C. In that case, ion-pairs are formed and dispersed in the oil phase. Use of cationic surfactants may change wettability. However, cationic surfactants may be incompatible with anionic surfactants typically used to decrease interfacial tension to also assist in enhancing oil recovery from subterranean formations.

SUMMARY OF THE INVENTION

Figure 1:
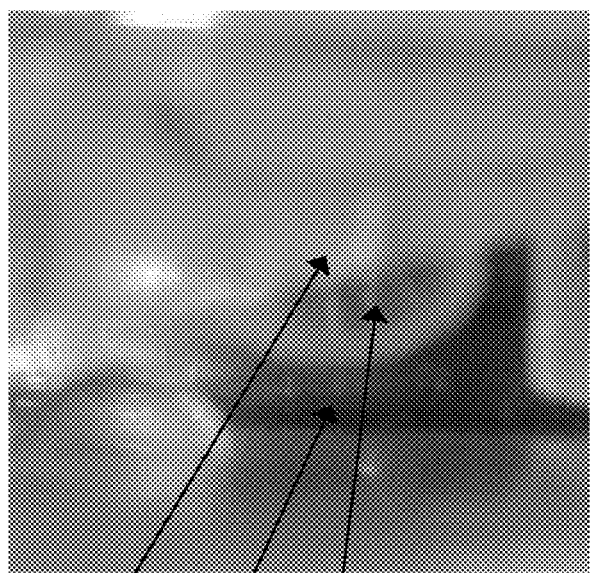
FIG. 1 shows a droplet of hexadecane under pure deionized water on CaCO3 crystal.

Materials that have a low surface energy, such as, for example, calcium carbonate, have hydrophobic surfaces. The hydrophobic properties of such materials are not desirable when trying to recover oil from a subterranean formation. There is a need for and methods for hydrophilizing low surface energy substrates.

In a first aspect, the present invention is directed to an aqueous fluid useful for the recovery of crude oil from a subterranean formation, comprising brine and one or more organophosphorus materials selected from:

(b)(1) organophosphorus compounds according to structure (I):

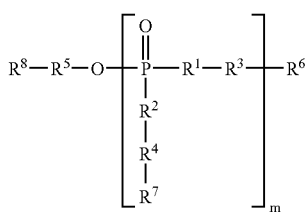

wherein: each $R^1$ is and each $R^2$ is independently absent or O, provided that at least one of $R^1$ and $R^2$ is O, each $R^3$ is independently alkyleneoxy, poly(alkyleneoxy), which may optionally, be substituted on one or more carbon atom of such alkyleneoxy, or poly(alkyleneoxy) group by hydroxyl, alkyl, hydroxyalkyl, alkoxy, alkenyl, aryl, or aryloxy, $R^5$ is and each $R^4$ is independently absent or alkyleneoxy, poly(alkyleneoxy), which may optionally, be substituted on one or more carbon atom of such alkyleneoxy, or poly(alkyleneoxy) group by hydroxyl, alkyl, hydroxyalkyl, alkoxy, alkenyl, aryl, or aryloxy, $R^6$ and $R^8$ are each and each $R^7$ is independently H, or $(C_1-C_{30})$hydrocarbon, which hydrocarbon may optionally be substituted on one or more carbon atoms by hydroxyl, fluorine, alkyl, alkenyl or aryl and/or interrupted at one or more sites by an O, N, or S heteroatom, or —$POR^9R^{10}$, $R^9$ and $R^{10}$ are each independently hydroxyl, alkoxy, aryloxy, or $(C_1-C_{30})$hydrocarbon, which hydrocarbon may optionally be substituted on one or more carbon atoms by hydroxyl, fluorine, alkyl, alkenyl or aryl and/or interrupted at one or more sites by an O, N, or S heteroatom, and m is an integer of from 1 to 5, (b)(2) salts of organophosphorus compounds according to structure (I), (b)(3) condensation reaction products of two or more molecules of one or more organophosphorus compounds according to structure (I), and (b)(4) mixtures comprising two or more of the compounds, salts, and/or reaction products of (b)(1), (b)(2), and (b)(3).

In a second aspect, the present invention is directed a method for recovering crude oil from a subterranean formation, comprising introducing to the formation an aqueous medium comprising water or brine and the organophosphorus material described above.

The treatment of surfaces with the present phosphate esters which are organophosphorous material results in changed surface properties. The reduced adsorption of crude oil hydrocarbons (like hexadecane in the figures) onto calcium carbonate facilitates the extraction of e.g. crude oil from porous stone materials in oil wells.

The phosphate esters are relatively inexpensive and easy to manufacture in comparison to many polymers used for surface treatments.

The phosphate esters are considered non-toxic and biodegradable.

Producing oil and gas wells have long been treated to stimulate production thereof utilizing a method termed "acidizing" in which an emulsion of an aqueous mineral acid either alone or in combination with various surfactants, corrosion inhibiting agents, and hydrocarbon oils is added to a producer well. Presumably, such treatments tend to remove deposits from the area of the subterranean oil or gas formation immediately adjacent to the production well bore, thus increasing the permeability of the formation and allowing residual oil or gas to be recovered through the well bore. Another object of such "acidizing" treatment of oil or gas producer wells is the removal of water from the interstices of the formation by the use of a composition which materially lowers the interfacial forces between the water and the oil or gas. Various surface-active agents have been recommended for this use.

The global average recovery factor for conventional oil fields is about 35% and it could be raised up to 50% through enhanced oil recovery. There are two essentials components to EOR: improving displacement efficiency and improving macroscopic sweep efficiency. The present invention provides phosphate esters which change the wettability of oil-wet carbonate in a subterranean formation to become water wet. Because the formation becomes water wet the present invention may be used together with chemical compounds used to improve displacement efficiency and macroscopic sweep efficiency.

There is no indication in any of the prior art references that the particular phosphate esters disclosed and claimed herein would be useful in returning to production oil and gas wells which are low-producing or have ceased to produce. The method of the invention is particularly useful in the stimulation of oil and gas wells which have failed to respond to acidizing treatment of the producing well including the use of various acids with various surfactants.

The phosphate esters advantageously are compatible with anionic surfactants typically used to decrease interfacial tension to also assist in enhancing oil recovery from subterranean formations.

DETAILED DESCRIPTION OF THE INVENTION

As used herein, the terminology "hydrophobic surface" means a surface that exhibits a tendency to repel water and to thus resist being wetted by water, as evidenced by a water contact angle of greater than or equal to 70°, more typically greater than or equal to 90°, and/or a surface free energy of less than or equal to about 40 dynes/cm.

As used herein, the terminology "hydrophilic surface" means a surface that exhibits an affinity for water and to thus be wettable by water, as evidenced by a water contact angle of less than 70°, more typically less than 60° and/or a surface energy of greater than about 40 dynes/cm, more typically greater than or equal to about 50 dynes/cm.

As used herein in reference to a hydrophobic surface, the term "hydrophilizing" means rendering such surface more hydrophilic and thus less hydrophobic, as indicated by a decreased water contact angle. One indication of increased hydrophilicity of a treated hydrophobic surface is a decreased water contact angle with a treated surface compared to the water contact angle with an untreated surface.

A used herein in reference to a substrate, the terminology "water contact angle" means the contact angle exhibited by a droplet of water on the surface as measured by a conventional image analysis method, that is, by disposing a droplet of water on the surface, typically a substantially flat surface, at 25° C., photographing the droplet, and measuring the contact angle shown in the photographic image.

Surface energy is estimated using the Young equation:

$$\cos(\theta) * \gamma_{lv} = \gamma_{sv} - \gamma_{sl}$$

with the contact angle θ, the interfacial energy $\gamma_{sv}$ between the solid and the vapor phase, the interfacial energy $\gamma_{sl}$ between the solid and the liquid phase, and the interfacial energy $\gamma_{lv}$ between the liquid and the vapor phase, and $\gamma_{sv}$ represents the surface energy of the solid.

As used herein, the notation "$(C_n\text{-}C_m)$" in reference to an organic group or compound, wherein n and m are integers, means that the group or compound contains from n to m carbon atoms per such group or compound.

As used herein, the term "alkyl" means a monovalent saturated straight chain or branched hydrocarbon radical, typically a monovalent saturated $(C_1\text{-}C_{30})$hydrocarbon radical, such as for example, methyl, ethyl, n-propyl, iso-propyl, n-butyl, sec-butyl, t-butyl, pentyl, or n-hexyl, which may optionally be substituted on one or more of the carbon atoms of the radical. In one embodiment, an alkyl radical is substituted on one or more carbon atoms of the radical with alkoxy, amino, halo, carboxy, or phosphono, such as, for example, hydroxymethyl hydroxyethyl, methoxymethyl, ethoxymethyl, isopropoxyethyl, aminomethyl, chloromethyl or trichloromethyl, carboxyethyl, or phosphonomethyl.

As used herein, the term "hydroxyalkyl" means an alkyl radical that is substituted on one of its carbon atoms with a hydroxyl group, such as As used herein, the term "alkoxyl" means an oxy radical that is substituted with an alkyl group, such as for example, methoxyl, ethoxyl, propoxyl, isopropoxyl, or butoxyl, which may optionally be further substituted on one or more of the carbon atoms of the radical.

As used herein, the term "cylcoalkyl" means a saturated cyclic hydrocarbon radical, typically a $(C_3\text{-}C_8)$ saturated cyclic hydrocarbon radical, such as, for example, cyclohexyl or cyclooctyl, which may optionally be substituted on one or more of the carbon atoms of the radical.

As used herein, the term "alkenyl" means an unsaturated straight chain, branched chain, or cyclic hydrocarbon radical that contains one or more carbon-carbon double bonds, such as, for example, ethenyl, 1-propenyl, or 2-propenyl, which may optionally be substituted on one or more of the carbon atoms of the radical.

As used herein, the term "aryl" means a monovalent unsaturated hydrocarbon radical containing one or more six-membered carbon rings in which the unsaturation may be represented by three conjugated double bonds, such as for example, phenyl, naphthyl, anthryl, phenanthryl, or biphenyl, which may optionally be substituted one or more of carbons of the ring. In one embodiment, an aryl radical is substituted on one or more carbon atoms of the radical with hydroxyl, alkenyl, halo, haloalkyl, or amino, such as, for example, methylphenyl, dimethylphenyl, hydroxyphenyl, chlorophenyl, trichloromethylphenyl, or aminophenyl.

As used herein, the term "aryloxy" means an oxy radical that is substituted with an aryl group, such as for example, phenyloxy, methylphenyl oxy, isopropylmethylphenyloxy.

As used herein, the indication that a radical may be "optionally substituted" or "optionally further substituted" means, in general, that is unless further limited, either explicitly or by the context of such reference, that such radical may be substituted with one or more inorganic or organic substituent groups, such as, for example, alkyl, alkenyl, aryl, aralkyl, alkaryl, a hetero atom, or heterocyclyl, or with one or more functional groups that are capable of coordinating to metal ions, such as hydroxyl, carbonyl, carboxyl, amino, imino, amido, phosphonic acid, sulphonic acid, or arsenate, or inorganic and organic esters thereof, such as, for example, sulphate or phosphate, or salts thereof.

As used herein, the terminology "$(C_x\text{-}C_y)$" in reference to an organic group, wherein x and y are each integers, indicates that the group may contain from x carbon atoms to y carbon atoms per group.

Organophosphorus Material

According to the present invention, the organophosphorous materials described by U.S. provisional patent application Nos. 60/842,265, filed Sep. 5, 2006 and 60/812,819, filed Jun. 12, 2006 (incorporated by reference) are injected in an aqueous mixture into the formation to improve water wettability, particularly when the formations include limestone (calcium carbonate).

In a first aspect, the present invention is directed to an aqueous fluid useful for the recovery of crude oil from a subterranean formation, comprising brine and one or more organophosphorus materials selected from:
(b)(1) organophosphorus compounds according to structure (I):

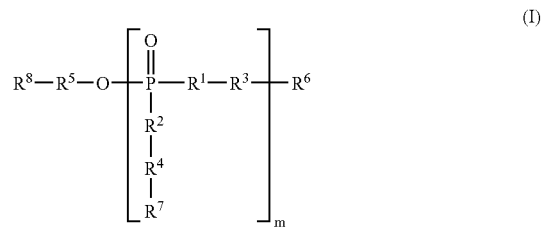

wherein: each $R^1$ is and each $R^2$ is independently absent or O, provided that at least one of $R^1$ and $R^2$ is O, each $R^3$ is independently alkyleneoxy, poly(alkyleneoxy), which may optionally, be substituted on one or more carbon atom of such alkyleneoxy, or poly(alkyleneoxy) group by hydroxyl, alkyl, hydroxyalkyl, alkoxy, alkenyl, aryl, or aryloxy, $R^5$ is and each $R^4$ is independently absent or alkyleneoxy, poly(alkyleneoxy), which may optionally, be substituted on one or more carbon atom of such alkyleneoxy, or poly(alkyleneoxy) group by hydroxyl, alkyl, hydroxyalkyl, alkoxy, alkenyl, aryl, or aryloxy, $R^6$ and $R^8$ are each and each $R^7$ is independently H, or $(C_1\text{-}C_{30})$hydrocarbon, which hydrocarbon may optionally be substituted on one or more carbon atoms by hydroxyl, fluorine, alkyl, alkenyl or aryl and/or interrupted at one or more sites by an O, N, or S heteroatom, or $-POR^9R^{10}$, $R^9$ and $R^{10}$ are each independently hydroxyl, alkoxy, aryloxy, or $(C_1\text{-}C_{30})$hydrocarbon, which hydrocarbon may optionally be substituted on one or more carbon atoms by hydroxyl, fluorine, alkyl, alkenyl or aryl and/or interrupted at one or more sites by an O, N, or S heteroatom, and m is an integer of from 1 to 5,
(b)(2) salts of organophosphorus compounds according to structure (I),
(b)(3) condensation reaction products of two or more molecules of one or more organophosphorus compounds according to structure (I), and
(b)(4) mixtures comprising two or more of the compounds, salts, and/or reaction products of (b)(1), (b)(2), and (b)(3).

In one embodiment, $R^6$ and $R^8$ are each and each $R^7$ is independently H, $(C_1\text{-}C_{30})$alkyl, $(C_1\text{-}C_{30})$alkenyl, or $(C_7\text{-}C_{30})$alkaryl.

In one embodiment, each $R^1$ and each $R^2$ is O, and the organophosphorus compound is selected from:

(II)(1) an organophosphate ester according to structure (II):

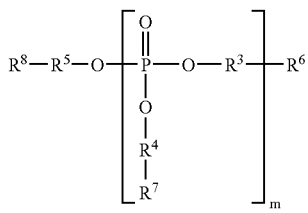

(II)

wherein $R^3$, $R^4$, $R^5$, $R^6$, $R^7$, $R^8$, and m are each as described above, (II)(2) salts of organophosphorus compounds according to structure (II), (II)(3) condensation reaction products of two or more molecules of one or more organophosphorus compounds according to structure (II), and (II)(4) mixtures comprising two or more of the compounds, salts, and/or reaction products of (II)(1), (II)(2), and (II)(3).

In one embodiment, each $R^1$ is absent, each $R^2$ is O, and the organophosphorus compound is selected from:

(III)(1) an organophosphonate ester according to structure (III):

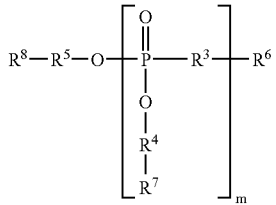

(III)

wherein $R^3$, $R^4$, $R^5$, $R^6$, $R^7$, $R^8$, and m are each as described above, (III)(2) salts of organophosphorus compounds according to structure (III), (III)(3) condensation reaction products of two or more molecules of one or more organophosphorus compounds according to structure (III), and (III)(4) mixtures comprising two or more of the compounds, salts, and/or reaction products of (III)(1), (III)(2), and (III)(3).

In one embodiment, each $R^1$ is O, each $R^2$ is absent, and the organophosphorus compound is selected from:

(IV)(1) an organophosphonate ester according to structure (IV):

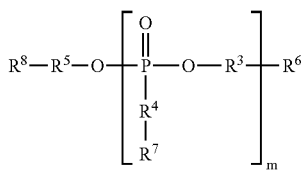

(IV)

wherein $R^3$, $R^4$, $R^5$, $R^6$, $R^7$, $R^8$, and m are each as described above, (IV)(2) salts of organophosphorus compounds according to structure (IV), (IV)(3) condensation reaction products of two or more molecules of one or more organophosphorus compounds according to structure (IV), and (IV)(4) mixtures comprising two or more of the compounds, salts, and/or reaction products of (IV)(1), (IV)(2), and (IV)(3).

In one embodiment, each $R^3$ is a divalent radical according to structure (V), (VI), (VII), or (VIII):

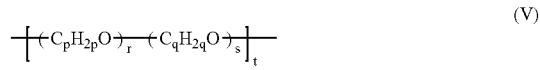

(V)

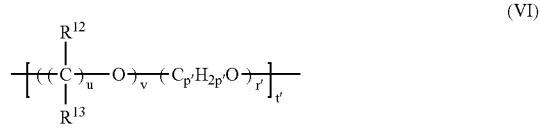

(VI)

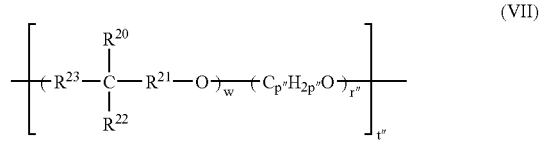

(VII)

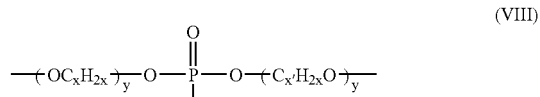

(VIII)

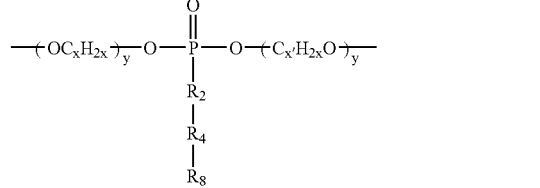

wherein:

each $R^{12}$ and each $R^{13}$ is independently H, hydroxyl, alkyl, hydroxyalkyl, alkoxy, alkenyl, aryl, aryloxy, or two $R^{12}$ groups that are attached to the adjacent carbon atoms may be fused to form, together with the carbon atoms to which they are attached, a $(C_6-C_8)$hydrocarbon ring, $R^{20}$ is H, hydroxyl, alkyl, hydroxyalkyl, alkoxy, alkenyl, aryl, or aryloxy $R^{22}$ is hydroxyl or hydroxyalkyl, provided that $R^{20}$ and $R^{22}$ are not each hydroxyl, $R^{23}$ and $R^{21}$ are each independently methylene or poly(methylene), p, p', p", q, and x are each independently integers of from 2 to 5, each r, s, r', r", and y is independently a number of from 0 to 25, provided that at least one of r and s is not 0, u is an integer of from 2 to 10, v and w are each numbers of from 1 to 25, and t, t', and t" are each numbers of from 1 to 25, provided that the product of the quantity (r+s) multiplied times t is less than or equal to about 100, the product of the quantity (v+r') multiplied times t' is less than or equal to about 100, and the product of the quantity (w+r") multiplied time t" is less than or equal to about 100.

In one embodiment, each $R^4$ and each $R^5$ is independently absent or a divalent radical according to structure (V), (VI), or (VII), wherein $R^{12}$, $R^{13}$, $R^{20}$, $R^{21}$, $R^{22}$, $R^{23}$, p, p', p", q, r, r', r", s, t, t", t, u, v, w, x, and y are as described above.

In one embodiment, each $R^3$ is independently a divalent radical according to structure (V), (VI), or (VII) wherein $R^{12}$, $R^{13}$, $R^{20}$, $R^{21}$, $R^{22}$, $R^{23}$, p, p', p", q, r, r', r', s, t, t", t, u, v, w, x, and y are as described above, and $R^4$ and $R^5$ are each independently absent or $R^3$.

In one embodiment, each $R^3$ is independently a divalent radical according to structure (V), wherein p is 2, 3, or 4, r is an integer from 1 to 25, s is 0, t is an integer of from 1 to 2, and $R^4$ and $R^5$ are each independently absent or $R^3$.

In one embodiment, each $R^3$ is independently a divalent radical according to structure (VI), wherein the $R^{12}$ groups are fused to form, including the carbon atoms to which they are attached, a ($C_6$-$C_8$) hydrocarbon ring, each $R^{13}$ is H, p' is 2 or 3, u is 2, v is an integer of from 1 to 3, r' is an integer from 1 to 25, t' is an integer of from 1 to 25, the product of the quantity (v+r') multiplied times t" is less than or equal to about 100, more typically less than or equal to about 50, and $R^4$ and $R^5$ are each independently absent or $R^3$.

In one embodiment, each $R^3$ is independently a divalent radical according to structure (VII), wherein $R^{20}$ is hydroxyl or hydroxyalkyl, $R^{22}$ is H, alkyl, hydroxyl, or hydroxyalkyl, provided that $R^{20}$ and $R^{22}$ are not each hydroxyl, $R^{21}$ and $R^{23}$ are each independently methylene, di(methylene), or tri(methylene), w is 1 or 2, p" is 2 or 3, r" is an integer of from 1 to 25, t" is an integer of from 1 to 25, the product of the quantity (w+r") multiplied times t" is less than or equal to about 100, more typically less than or equal to about 50, and $R^4$ and $R^5$ are each independently absent or $R^3$.

In one embodiment of the organophosphorus compound according to structure (II):
$R^6$ and $R^8$ are each and each $R^7$ is independently H or ($C_1$-$C_{30}$)hydrocarbon, which hydrocarbon may optionally be substituted on one or more carbon atoms by hydroxyl, fluorine, alkyl, alkenyl or aryl and/or interrupted at one or more sites by an O, N, or S heteroatom, or —$POR^9R^{10}$, more typically, $R^6$, $R^8$, and each $R^7$ are each H,
$R^4$ and $R^5$ are each absent,
each $R^3$ is independently a divalent radical according to structure (V), (VI), or (VII), and
m is an integer of from 1 to 5.

In one embodiment of the organophosphorus compound according to structure (II):
$R^6$, $R^8$, and each $R^7$ are each H,
$R^4$ and $R^5$ are each absent,
each $R^3$ is independently a divalent radical according to structure (V),
each p is independently 2, 3, or 4, more typically 2 or 3,
each r is independently a number of from 1 to about 100, more typically from 2 to about 50,
each s is 0,
each t is 1, and
m is an integer of from 1 to 5.

In one embodiment, the organophosphorus material is selected from:
(IX)(1) organophosphorus compounds according to structure (IX):

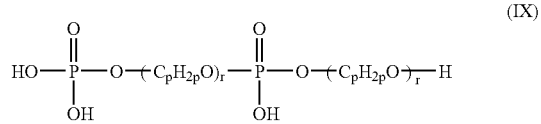

wherein:
p is 2, 3, or 4, more typically 2 or 3,
r is a number of from 4 to about 50, (IX)(2) salts organophosphorus compounds according to structure (IX), and (IX)(3) mixtures comprising two or more of the compounds and/or salts of (IX)(1) and (IX)(2).

In one embodiment of the organophosphorus compound according to structure (II):
$R^6$, $R^8$, and each $R^7$ are each H
$R^4$ and $R^5$ are each absent,
each $R^3$ is independently a divalent radical according to structure (VI),
the $R^{12}$ groups are fused to form, including the carbon atoms to which they are attached, a ($C_6$-$C_8$)hydrocarbon ring,
each $R^{13}$ is H
p' is 2 or 3,
u is 2,
v is 1,
r' is a number of from 1 to 25,
t' is a number of from 1 to 25,
the product of the quantity (v+r') multiplied times t' is less than or equal to about 100, and
m is an integer of from 1 to 5.

In one embodiment of the organophosphorus compound according to structure (II):
$R^6$, $R^8$, and each $R^7$ are each H,
$R^4$ and $R^5$ are each absent,
each $R^3$ is independently a divalent radical according to structure (VII),
$R^{20}$ is hydroxyl or hydroxyalkyl,
$R^{22}$ is H, alkyl, hydroxyl, or hydroxyalkyl,
$R^{23}$ and $R^{21}$ are each independently methylene, di(methylene), or tri(methylene),
w is 1 or 2,
p" is 2 or 3,
r" is a number of from 1 to 25,
t" is a number of from 1 to 25
the product of the quantity (w+r") multiplied times t" is less than or equal to about 100, and
m is an integer of from 1 to 5.

In one embodiment, the organophosphorus compound is according to structure (III), each $R^3$ is a divalent radical according to structure (V) with s=0 and t=1, $R^4$ and $R^5$ are each absent, and $R^6$, $R^7$, and $R^8$ are each H.

In one embodiment, the organophosphorus compound is according to structure (IV), wherein R3 and R5 are each according to structure (V), with s=0 and t=1, and $R^6$ and $R^8$ are each H.

In one embodiment, the organophosphorus material (b)(I) comprises a condensation reaction product of two or more molecules according to structure (I).

In one embodiment, the organophosphorus material (b)(I) comprises a condensation reaction product of two or more molecules according to structure (I) in the form of a linear molecule, such as, for example, a linear condensation reaction product according to structure (X), formed by condensation of a molecule according to structure (II) with a molecule according to structure (IV):

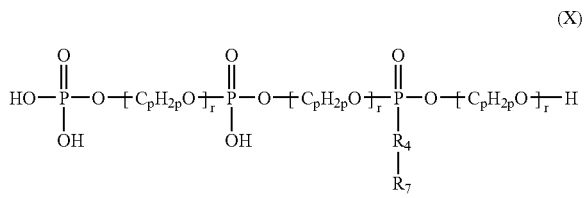

(X)

wherein $R^4$, $R^7$, p, r are each as described above.

In one embodiment, the organophosphorus material (b)(I) comprises a condensation reaction product of two or more molecules according to structure (I) in the form of a crosslinked network. A portion of an exemplary crosslinked condensation reaction product network is illustrated by structure (XI):

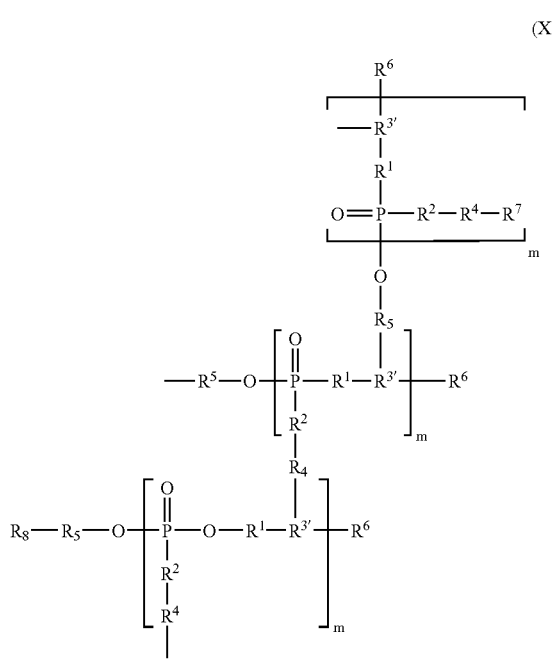

(XI)

wherein $R^1$, $R^2$, $R^4$, $R^5$, $R^6$, $R^7$, $R^8$, and m are each as described above, and each $R^{3'}$ is independently a residue of an $R^3$ group of a compound according to structure (I), as described above, wherein the $R^3$ group is a alkyleneoxy or poly(alkyleneoxy) moiety substituted with hydroxyl-, hydroxyalkyl-, hydroxyalkyleneoxy- or hydroxypoly(alkyleneoxy)- on one or more carbon atoms of the alkyleneoxy or poly(alkyleneoxy) moiety, and —$R^{3'}$—$R_4$— and —$R^{3'}$—$R^5$ each represent a respective linkage formed by condensation of such an $R^3$ group and a —$R^{3'}$—$R^5$— or $R^8$—$R^5$— group of molecules of another molecule of a compound according to structure (I).

In one embodiment, the organophosphorus material (b)(I) comprises a condensation reaction product of two or more molecules according to structure (I) and the condensation reaction product forms a covalently crosslinked organophosphorus network. Typically the solubility of the covalently crosslinked organophosphorus network in water is less than that of the organophosphorus compound according to structure (I), more typically, the covalently crosslinked organophosphorus network is substantially insoluble in water.

As used herein, the term "salts" refers to salts prepared from bases or acids including inorganic or organic bases and inorganic or organic acids.

In one embodiment, the organophosporus material (b)(I) is in the form of a salt that comprises an anion derived (for example, by deprotonation of a hydroxyl or a hydroxyalkyl substituent) from of an organophosphorus compound according to structure (I) and one or more positively charged counterions derived from a base.

Suitable positively charged counterions include inorganic cations and organic cations, such as for example, sodium cations, potassium cations, calcium cations, magnesium cations, copper cations, zinc cations, ammonium cations, tetraalkylammonium cations, as well as cations derived from primary, secondary, and tertiary amines, and substituted amines.

In one embodiment, the cation is a monovalent cation, such as for example, $Na^+$, or $K^+$.

In one embodiment, the cation is a polyvalent cation, such as, for example, $Ca^{+2}$, $Mg^{+2}$, $Zn^{+2}$, $Mn^{+2}$, $Cu^{+2}$, $Al^{+3}$, $Fe^{+2}$, $Fe^{+3}$, $Ti^{+4}$, $Zr^+$, in which case the organophosporus compound may be in the form of a "salt complex" formed by the organophosphorus compound and the polyvalent cation. For organophosphorus compound having two or more anionic sites, e.g., deprotonated hydroxyl substituents, per molecule, the organophosphorus compound-polyvalent cation complex can develop an ionically crosslinked network structure. Typically the solubility of the ionically crosslinked organophosphorus network in water is less than that of the organophosphorus compound according to structure (I), more typically, the ionically crosslinked organophosphorus network is substantially insoluble in water.

Suitable organophosphorus compounds can be made by known synthetic methods, such as by reaction of one or more compounds, each having two or more hydroxyl groups per molecule, with phosphoric acid, polyphosphoric acid, and or phosphoric anhydride, such as disclosed, for example, in U.S. Pat. Nos. 5,550,274, 5,554,781, and 6,136,221.

Typically one or more compounds of the present invention may be injected in an aqueous composition into the formation. For example, the aqueous fluid comprises, based on 100 parts by weight ("pbw") of the fluid, from about 0.01 to about 5 parts by weight (pbw), more typically, from about 0.05 to about 2 or 3 pbw, organophosphorus material, and from about 0.1 to 1 pbw.

As mentioned above, the compounds of the present invention may be used with other compounds used for enhancing oil-recovery. For example, a hydrocarbon recovery composition including one or more compounds of the present invention alone or with other compounds for enhancing oil recovery may be provided to the hydrocarbon containing formation. For example, a composition may include one or more of the present phosphate esters together with one or, more nonionic additives (e.g., alcohols, ethoxylated alcohols, nonionic surfactants and/or sugar based esters) and one or more anionic surfactants (e.g. sulfates, sulfonates, ethoxylated sulfates, and/or phosphates).

Alcohol

Alcohol can be used as mutual solvent to reduce water saturation. The interfacial tension between oil and ethanol is much lower than between oil and brine.

Capillary forces of retention for the alcohol are much reduced compared to those for brine.

It has been reported that isopropyl or butyl alcohol plus methyl alcohol could be used in miscible displacement to increase oil recovery of naphtha and mineral oil.

Others have investigated enhanced oil recovery by alcohol flooding. Their process design was strongly guided by the ternary phase of alcohol/oil/brine. They showed that oil recovery was highly dependent on the choice of alcohol/oil/brine combinations. Others have reported that injection of appropriate combinations of oil-soluble and water-soluble solvents such as alcohols and ketones could significantly enhance oil recovery.

In an embodiment, an aliphatic nonionic additive may be used in a hydrocarbon recovery composition. As used herein, the term "aliphatic" refers to a straight or branched chain of carbon and hydrogen atoms. In some embodiments, an aliphatic portion of an aliphatic nonionic additive may have an average carbon number from 10 to 24. In some embodiments, an aliphatic portion of an aliphatic nonionic additive may have an average carbon number from 12 to 18. In some embodiments, the aliphatic nonionic additive may include a branched aliphatic portion. A branched aliphatic portion of an aliphatic nonionic additive may have an average carbon number from 16 to 17. In some embodiments, a branched aliphatic group of an aliphatic nonionic additive may have less than about 0.5 percent aliphatic quaternary carbon atoms. In an embodiment, an average number of branches per aliphatic nonionic additive ranges from about 0.1 to about 2.5. In other embodiments, an average number of branches per aliphatic nonionic additive ranges from about 0.7 to about 2.5.

Methyl branches may represent between about 20 percent to about 99 percent of the total number of branches present in the branched nonionic additive. In some embodiments, methyl branches may represent greater than about 50 percent of the total number of branches in a branched nonionic additive. The number of ethyl branches in the alcohol may represent, in certain embodiments, less than about 30 percent of the total number of branches. In other embodiments, the number of ethyl branches, if present, may be between about 0.1 percent and about 2 percent of the total number of branches. Branches other than methyl or ethyl, if present, may be less than about 10 percent of the total number of branches. In some embodiments, less than about 0.5 percent of the total number of branches are neither ethyl or methyl groups.

In an embodiment, an aliphatic nonionic additive may be a long chain aliphatic alcohol. The term "long chain," as used herein, refers to a carbon chain having an average carbon number from 10 to 30. A long chain aliphatic alcohol (e.g., a long chain primary alcohol) may be purchased commercially (e.g., Neodol® alcohols manufactured by Shell Chemical Co., Houston, Tex.). In certain embodiments, a long chain aliphatic alcohol may be prepared by a variety of generally known methods. A long chain aliphatic alcohol may have an average carbon number from 10 to 24. In some embodiments, a long chain aliphatic alcohol may have an average carbon number from 12 to 18. In other embodiments, a long chain aliphatic alcohol may have an average carbon number from 16 to 17.

In an embodiment, a portion of the long chain aliphatic alcohol may be branched. Branched long chain aliphatic alcohols may be prepared by hydroformylation of a branched olefin. Preparations of branched olefins are described in U.S. Pat. No. 5,510,306 to Murray, entitled "Process For Isomerizing Linear Olefins to Isoolefins;" U.S. Pat. No. 5,648,584 to Murray, entitled "Process For Isomerizing Linear Olefins to Isoolefins" and U.S. Pat. No. 5,648,585 to Murray, entitled "Process For Isomerizing Linear Olefins to Isoolefins," all of which are incorporated by reference herein. Preparations of branched long chain aliphatic alcohols are described in U.S. Pat. No. 5,849,960 to Singleton et al., entitled "Highly Branched Primary Alcohol Compositions, and Biodegradable Detergents Made Therefrom;" U.S. Pat. No. 6,150,222 to Singleton et al., entitled "Highly Branched Primary Alcohol Compositions, and Biodegradable Detergents Made Therefrom;" U.S. Pat. No. 6,222,077 to Singleton et al., entitled "Highly Branched Primary Alcohol Compositions, and Biodegradable Detergents Made Therefrom," all of which are incorporated by reference herein.

In some embodiments, branches of a branched aliphatic group of a long chain aliphatic alcohol may have less than about 0.5 percent aliphatic quaternary carbon atoms. In an embodiment, an average number of branches per long chain aliphatic alcohol ranges from about 0.1 to about 2.5. In other embodiments, an average number of branches per alcohol ranges from about 0.7 to about 2.5.

Methyl branches may represent between about 20 percent to about 99 percent of the total number of branches present in the branched long chain aliphatic alcohol. In some embodiments, methyl branches may represent greater than about 50 percent of the total number of branches in a branched long chain aliphatic alcohol. The number of ethyl branches in the alcohol may represent, in certain embodiments, less than about 30 percent of the total number of branches. In other embodiments, the number of ethyl branches, if present, may be between about 0.1 percent and about 2 percent of the total number of branches. Branches other than methyl or ethyl, if present, may be less than about 10 percent of the total number of branches. In some embodiments, less than about 0.5 percent of the total number of branches are neither ethyl nor methyl groups.

Aliphatic Anionic Surfactants

In an embodiment, an aliphatic anionic surfactant may be used in a hydrocarbon recovery composition. In certain embodiments, an aliphatic portion of an aliphatic anionic surfactant may have an average carbon number from 10 to 24. In some embodiments, an aliphatic portion of an aliphatic anionic surfactant may have an average carbon number from 12 to 18. In other embodiments, an aliphatic portion of an aliphatic anionic surfactant may have an average carbon number from 16 to 17. In some embodiments, the aliphatic anionic surfactant may include a branched aliphatic portion. In some embodiments, a branched aliphatic group of an aliphatic anionic surfactant may have less than about 0.5 percent aliphatic quaternary carbon atoms. In an embodiment, an average number of branches per aliphatic anionic surfactant ranges from about 0.1 to about 2.5. In other embodiments, an average number of branches per aliphatic anionic surfactant ranges from about 0.7 to about 2.5.

Methyl branches may represent between about 20 percent to about 99 percent of the total number of branches present in the branched anionic surfactant. In some embodiments, methyl branches may represent greater than about 50 percent of the total number of branches in a branched anionic surfactant. The number of ethyl branches in the alcohol may represent, in certain embodiments, less than about 30 percent of the total number of branches. In other embodiments, the number of ethyl branches, if present, may be between about 0.1 percent and about 2 percent of the total number of branches. Branches other than methyl or ethyl, if present, may be less than about 10 percent of the total number of branches. In some embodiments, less than about 0.5 percent of the total number of branches are neither ethyl or methyl groups.

In an embodiment which further employs aliphatic anionic surfactant, a solution may provided which contains an effective amount of an aliphatic anionic surfactant selected from the group of compounds having the general formula: $R_1O(C_3H_6O)_m(C_2H_4O)_nYX$ wherein $R_1$ is a linear or branched alkyl radical, an alkenyl radical, or an alkyl or alkenyl substituted benzene radical, the non-aromatic portion of the radical containing from 6 to 24 carbon atoms; m has an average value of from 1 to 10; n has an average value of from 1 to 10; Y is a hydrophilic group; and X is a cation, preferably monovalent, for example N, K, $NH_4^+$. Y is a suitable hydrophilic group or substituted hydrophilic group such as, for example, the sulfate, sulfonate, phosphonate, phosphate or carboxylate radical. Preferably, $R_1$ is a branched alkyl radical having at least two branching groups and Y is a sulfonate or phosphate group.

Other Optional Additives

The aqueous fluid of the present invention may, optionally, further comprise clay stabilization or sand stabilization material. During oil recovery processes, sands and other materials may become entrained in the recovered oil. This may be mitigated by the addition of a clay stabilization or sand stabilization material. Suitable clay stabilization or sand stabilization materials include epoxy resins, polyfunctional cationic polymers, such as poly(N-acrylamidomethyltnrnethyl ammonium chloride) or poly(vinylbenzyltrimethyl ammonium chloride).

Other optional ingredients that may be added to the aqueous fluid of the present invention include, but are not limited to polymers such as biopolysaccharides, cellulose ethers, acrylamide-derived polymers, corrosion inhibitors, oxygen scavengers, bactericides, and so forth, and any combination thereof.

The aqueous fluid of the present invention is introduced into the crude oil-bearing formation, typically by injecting the fluid into the formation.

In the case of a carbonate formation having hydrophobic surfaces, addition of the organophosphorous material to the aqueous flooding fluid modifies such surfaces to increase the surface energy of such surfaces and render such surfaces more readily wettable by water. The surface modified formation more readily imbibes the aqueous flooding fluid, thus increasing the amount of aqueous fluid imbibed by the formation and increasing the amount of crude oil displaced from the formation by the aqueous fluid.

The aqueous fluid may be used in secondary or tertiary oil recovery processes, although the use of such fluids in other applications is also not excluded.

Methods of Use

The aqueous medium utilized to form the solution including the organophosphorous material of the invention can be soft water, brackish water, or a brine.

Optionally, after injection of the aqueous fluid comprising the present phosphate esters of the present invention addition to crude oil having generally the viscosity of the oil-bearing formation of the oil well to be treated, various hydrocarbon solvents may be employed to displace the aqueous solution out into the reservoir. Such hydrocarbon solvents as the low molecular weight, generally liquid hydrocarbons boiling below the gasoline range, such as the lower alkanes including butane, propane, pentane, hexane and heptane, as well as natural gasoline, petroleum naphtha and kerosene or mixtures of these hydrocarbons, are useful. Both sweet and sour crude oil is useful as a hydrocarbon to displace the aqueous solution out into the subterranean reservoir of oil or gas.

Optionally, injection of a preflush fluid may be utilized prior to injection of the aqueous fluid of the present invention. The preflush may consist of a hydrocarbon fluid, a brine solution, or simply water.

Also, injection of the aqueous fluid comprising the present phosphate esters may optionally be followed by an injection of a surfactant, a mobility control fluid or a polymeric flush, which is typically a polymer-thickened aqueous solution, using, for example the polymers disclosed above, into the formation to further enhance oil recovery. The polymeric solution is utilized to drive or push the now oil bearing surfactant flood out of the reservoir, thereby "sweeping" crude oil out of the reservoir. Further, the polymeric solution has a very high viscosity which helps to prevent what is referred to in the industry as channeling or "fingering", thus improving sweep efficiency.

This polymeric flush or mobility control fluid may once again be followed by a water flush which may be brine or saline or softened water, or fresh water.

Oil is recovered at a production well spaced apart from the injection well as the drive fluid pushes the mobility buffer slug which sweeps the oil out of the pores in the formation and to the production well. Once the water/oil emulsion reaches the surface, it is put into holding tanks where it is subsequently demulsified, thereby allowing the oil to separate from the water through the natural forces of gravity.

For example, a hydrocarbon recovery composition including the phosphate esters of the present invention may be added to a portion of hydrocarbon containing formation that may have an average temperature of less than 80° C. To facilitate delivery of an amount of the hydrocarbon recovery composition to the hydrocarbon containing formation, the hydrocarbon composition may be combined with water or brine to produce an injectable fluid. Typically about 0.01 to about 5 wt % of the phosphate ester, based on the total weight of injectable fluid, may be injected into the hydrocarbon containing formation through an injection well. In certain embodiments, the concentration of the hydrocarbon recovery composition injected through the injection well may be about 0.05% to about 3 wt. %, based on the total weight of injectable fluid. In some embodiments, the concentration of the hydrocarbon recovery composition may be about 0.1% to about 1 wt. % based on the total weight of injectable fluid.

In some embodiments, a hydrocarbon recovery composition may be added to a portion of a hydrocarbon containing formation.

EXAMPLES

Figure 3:
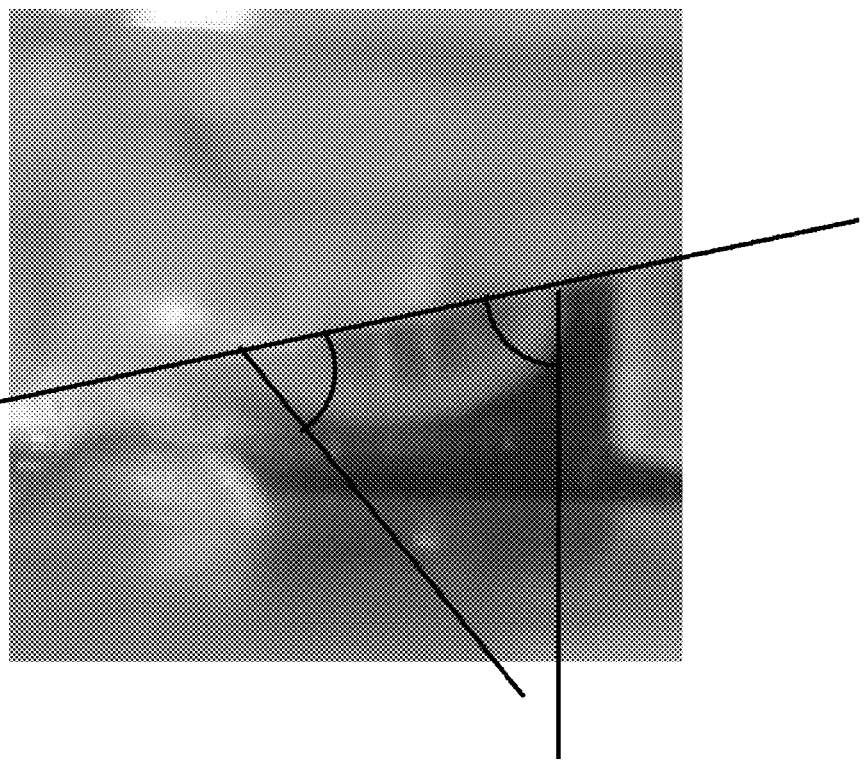
FIG. 3 is FIG. 1 labeled to show the contact angle.

FIG. 1 shows a droplet of hexadecane under pure deionized water on CaCO3 crystal. FIG. 3 is FIG. 1 labeled to show the contact angle. FIG. 3 shows the contact angle was 60°-80°.

Figure 2:
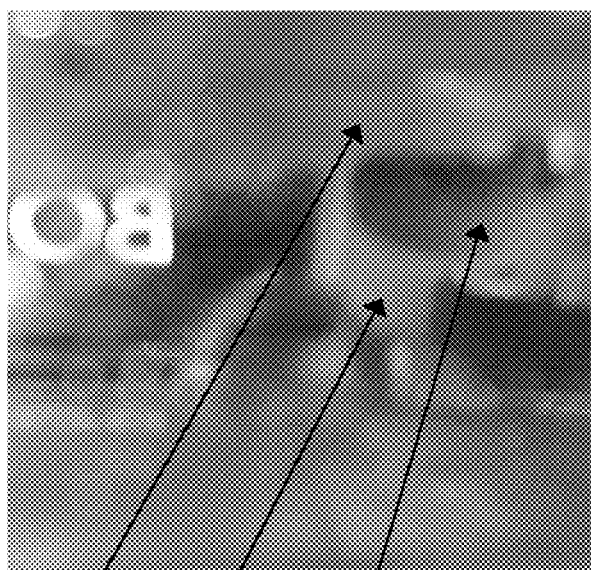
FIG. 2 shows a droplet of hexadecane under pure deionized water on CaCO3 crystal pretreated with PEG1000 phosphate ester to show the adsorption of PEG1000 phosphate ester onto the CaCO3 crystal increases the contact angle of hexadecane on CaCO3 under water.
Figure 4:
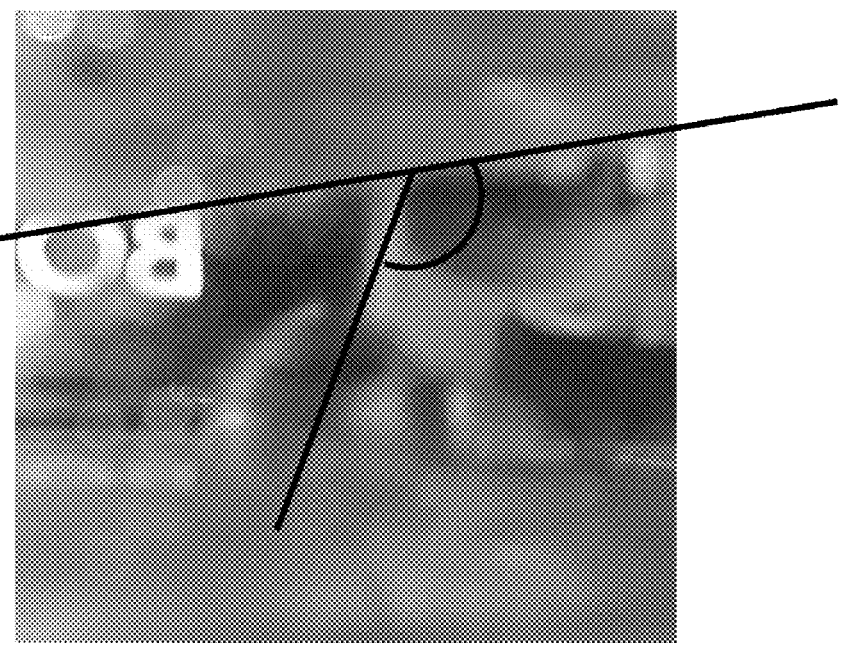
FIG. 4 is FIG. 2 labeled to show the contact angle.

FIG. 2 shows a droplet of hexadecane under 1 wt. % PEG 1000 phosphate ester at pH of 10 in water on CaCO3 crystal pretreated with PEG1000 phosphate ester. This shows the adsorption of PEG1000 phosphate ester onto the CaCO3 crystal increases the contact angle of hexadecane on CaCO3 under water. The pretreatment of calcium carbonate crystal was done by immersing the crystal in an aqueous solution of e.g. PEG1000 phosphate ester (e.g. 1 wt %, pH 6-7). A successful adsorption onto the crystal and a respective change of the surface properties is shown by measuring the contact angle of hexadecane under water. FIG. 4 is FIG. 2 labeled to show the contact angle. FIG. 4 shows the contact angle was >130°.

Comparison of FIGS. 3 and 4 shows the adsorption of PEG1000 phosphate ester onto the $CaCO_3$ crystal increases the contact angle of hexadecane on $CaCO_3$ under pure deionized water from <80° to >130°.

Thus, a low contact angle of hexadecane is observed for the untreated crystal (i.e. good adsorption of the oil onto the crystal, which is undesirable) and a high contact angle of hexadecane is observed for the treated crystal (i.e. poor adsorption of the oil onto the crystal, which is desirable).

It is apparent that embodiments other than those expressly described above come within the spirit and scope of the present claims. Thus, the present invention is not defined by the above description, but rather is defined by the claims appended hereto.

What is claimed is:

1. A method for recovering crude oil from a subterranean formation, comprising introducing to the formation an aqueous fluid comprising:
    (a) water or brine and
    (b) an organophosphorus material selected from the group consisting of:
        (b)(1) organophosphorus compounds according to structure (I):

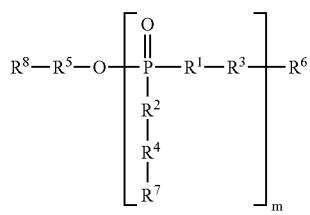

wherein:
    each $R^1$ is and each $R^2$ is independently absent or O, provided that at least one of $R^1$ and $R^2$ is O,
    each $R^3$ is independently alkyleneoxy, poly(alkyleneoxy), which may optionally, be substituted on one or more carbon atom of such alkyleneoxy, or poly(alkyleneoxy) group by alkyl, alkoxy, alkenyl, aryl, or aryloxy,
    $R^5$ is and each $R^4$ is independently absent or alkyleneoxy, poly(alkyleneoxy), which may optionally, be substituted on one or more carbon atom of such alkyleneoxy, or poly(alkyleneoxy) group by alkyl, alkoxy, alkenyl, aryl, or aryloxy,-
    $R^6$ and $R^8$ are each and each $R^7$ is independently H, or $(C_1-C_{30})$hydrocarbon, which hydrocarbon may optionally be substituted on one or more carbon atoms by fluorine, alkyl, alkenyl or aryl, on one carbon atom by hydroxyl, and/or interrupted at one or more sites by an O, N, or S heteroatom, or $-POR^9R^{10}$,
    $R^9$ and $R^{10}$ are each independently alkoxy, aryloxy, or $(C_1-C_{30})$hydrocarbon, which hydrocarbon may optionally be substituted on one or more carbon atoms by fluorine, alkyl, alkenyl or aryl and/or interrupted at one or more sites by an O, N, or S heteroatom, and
    m is an integer of from 2 to 5,
        (b)(2) salts of organophosphorus compounds according to structure (I),
        (b)(3) condensation reaction products of two or more molecules of one or more organophosphorus compounds according to structure (I), and
        (b)(4) mixtures comprising two or more of the compounds, salts, and/or reaction products of (b)(1), (b)(2), and (b)(3).

2. The method of claim 1, wherein in the organophosphorus compounds, each $R^1$ and each $R^2$ is O, and the organophosphorus compound is selected from the group consisting of:
    (II)(1) an organophosphate ester according to structure (II):

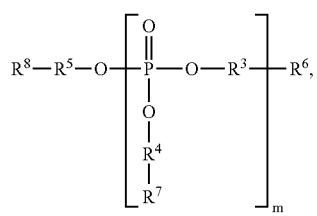

(II)(2) salts of organophosphorus compounds according to structure (II),
    (II)(3) condensation reaction products of two or more molecules of one or more organophosphorus compounds according to structure (II), and
    (II)(4) mixtures comprising two or more of the compounds, salts, and/or reaction products of (II)(1), (II)(2), and (II)(3).

3. The method of claim 1, wherein in the organophosphorus compounds, each $R^1$ is absent, each $R^2$ is O, and the organophosphorus compound is selected from the group consisting of:
    (III)(1) an organophosphonate ester according to structure (III):

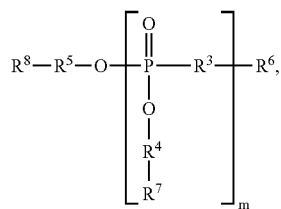

(III)(2) salts of organophosphorus compounds according to structure (III),
    (III)(3) condensation reaction products of two or more molecules of one or more organophosphorus compounds according to structure (III), and
    (III)(4) mixtures comprising two or more of the compounds, salts, and/or reaction products of (III)(1), (III)(2), and (III)(3).

4. The method of claim 1, wherein in the organophosphorus compounds, each $R^1$ is O, each $R^2$ is absent, and the organophosphorus compound is selected from the group consisting of:

(IV)(1) an organophosphonate ester according to structure (IV):

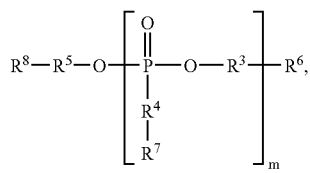
(IV)

(IV)(2) salts of organophosphorus compounds according to structure (IV),
(IV)(3) condensation reaction products of two or more molecules of one or more organophosphorus compounds according to structure (IV), and
(IV)(4) mixtures comprising two or more of the compounds, salts, and/or reaction products of (IV)(1), (IV)(2), and (IV)(3).

5. The method of claim 1, wherein in the organophosphorus compounds, each $R^3$ is a divalent radical according to structure (V), (VI), or (VII):

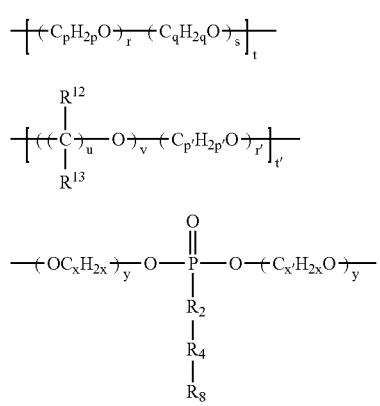

wherein:
each $R^{12}$ and each $R^{13}$ is H, alkyl, alkoxy, alkenyl, aryl, aryloxy, or two $R^{12}$ groups that are attached to the adjacent carbon atoms may be fused to form, together with the carbon atoms to which they are attached, a ($C_6$-$C_8$) hydrocarbon ring,
$R^{20}$ is H,
p, p', q, x and x' are each independently integers of from 2 to 5,
each r, s, r', r", and y is independently a number of from 0 to 25, provided that at least one of r and s is not 0,
u is an integer of from 2 to 10,
v and w are each numbers of from 1 to 25, and
t, t', and t" are each numbers of from 1 to 25,
provided that the product of the quantity (r+s) multiplied times t is less than or equal to about 100, the product of the quantity (v+r') multiplied times t' is less than or equal to about 100, and the product of the quantity (w+r") multiplied time t" is less than or equal to about 100.

6. The method of claim 5, wherein in the organophosphorus compounds, each $R^4$ and each $R^5$ is independently absent or a divalent radical according to structure (V) or (VI).

7. The method of claim 5, wherein in the organophosphorus compounds, each $R^3$ is independently a divalent radical according to structure (V) or (VI), wherein $R^4$ and are each independently absent or $R^3$.

8. The method of claim 5, wherein in the organophosphorus compounds, each $R^3$ is independently a divalent radical according to structure (V), wherein p is 2, 3, or 4, r is an integer from 1 to 25, s is 0, t is an integer of from 1 to 2, and $R^4$ and $R^5$ are each independently absent or $R^3$.

9. The method of claim 5, wherein in the organophosphorus compounds, each $R^3$ is independently a divalent radical according to structure (VI), wherein the $R^{12}$ groups are fused to form, including the carbon atoms to which they are attached, a ($C_6$-$C_8$) hydrocarbon ring, each $R^{13}$ is H, p' is 2 or 3, u is 2, v is an integer of from 1 to 3, r' is an integer from 1 to 25, t' is an integer of from 1 to 25, the product of the quantity (v+r') multiplied times t" is less than or equal to about 100, and $R^4$ and $R^5$ are each independently absent or $R^3$.

10. The method of claim 5, wherein in the organophosphorus compounds, each $R^1$ and each $R^2$ is O, and the organophosphorus compound is selected from:

(II)(1) an organophosphate ester according to structure (II):

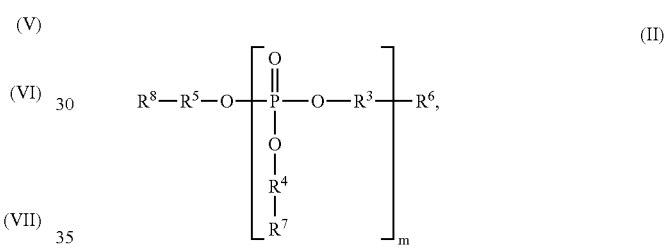
(II)

(II)(2) salts of organophosphorus compounds according to structure (II), and
(II)(3) condensation reaction products of two or more molecules of one or more organophosphorus compounds according to structure (II), and
(II)(4) mixtures comprising two or more of the compounds, salts, and/or reaction products of (II)(1), and (II)(2), and (II)(3),
wherein in the organophosphorus compounds, according to structure (II)
$R^6$ and $R^8$ are each and each $R^7$ is independently H or ($C_1$-$C_{30}$)hydrocarbon, which hydrocarbon may optionally be substituted on one or more carbon atoms by fluorine, alkyl, alkenyl or aryl, on one carbon atom by hydroxyl, and/or interrupted at one or more sites by an O, N, or S heteroatom, or —$POR^9R^{10}$,
$R^4$ and $R^5$ are each absent,
each $R^3$ is independently a divalent radical according to structure (V), (VI), or (VII), and
m is an integer of from 2 to 5.

11. The method of claim 10, wherein $R^6$, $R^8$ and each $R^7$ are each H.

12. The method of claim 2, wherein in the organophosphorus compounds, according to structure (II):
$R^8$ and each $R^7$ are each H,
$R^4$ and $R^5$ are each absent,
each $R^3$ is independently a divalent radical according to structure (V),

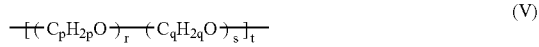
(V)

each p, q is independently 2, 3, or 4,
each r is independently a number of from 1 to about 100,
each s is 0,
each t is 1, and
m is an integer of from 2 to 5.

13. The method of claim 1, wherein the organophosphorus material is selected from:
(X)(1) organophosphorus compounds according to structure (IX):

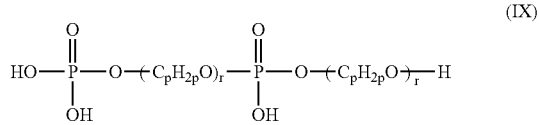
(IX)

wherein:
p is 2, 3, or 4,
r is a number of from 4 to about 50,
(IX)(2) salts of organophosphorus compounds according to structure (IX), and
(IX)(3) mixtures comprising two or more of the compounds and/or salts of (IX)(1) and (IX)(2).

14. The method of claim 5, wherein in the organophosphorus compounds, each $R^1$ and each $R^2$ is O, and the organophosphorus compound is selected from:
(II)(1) an organophosphate ester according to structure (II):

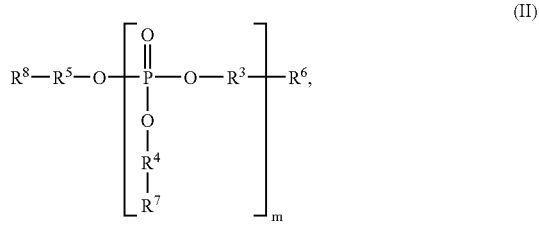
(II)

(II)(2) salts of organophosphorus compounds according to structure (II), and
(II)(3) condensation reaction products of two or more molecules of one or more organophosphorus compounds according to structure (II), and
(II)(4) mixtures comprising two or more of the compounds, salts, and/or reaction products of (II)(1), (II)(2), and (II)(3),
wherein in the organophosphorus compounds, according to structure (II):
$R^6$, $R^8$ and each $R^7$ are each H,
$R^4$ and $R^5$ are each absent,
each $R^3$ is independently a divalent radical according to structure (VI),
the $R^{12}$ groups are fused to form, including the carbon atoms to which they are attached, a $(C_6-C_8)$hydrocarbon ring,
each $R^{13}$ is H
p' is 2 or 3,
u is 2,
v is 1,
r' is a number of from 1 to 25,
t' is a number of from 1 to 25,
the product of the quantity (v+r') multiplied times t' is less than or equal to about 100, and
m is an integer of from 2 to 5.

15. The method of claim 3, wherein the organophosphorus compound is according to structure (III), each $R^3$ is a divalent radical according to structure (V) with s =0 and t=1, $R^4$ and $R^5$ are each absent, and $R^6$, $R^7$, and $R^8$ are each H.

16. The method of claim 4, wherein in the organophosphorus compounds, the organophosphorus compound is according to structure (IV), wherein R3 and R5 are each according to structure (V), with s=0 and t=1, and $R^6$ and $R^8$ are each H.

17. The method of claim 1, wherein the organophosphorus material (b)(I) comprises a condensation reaction product of two or more molecules according to structure (I).

18. The method of claim 1, wherein the organophosphorus material (b)(I) comprises a condensation reaction product of two or more molecules according to structure (I) in the form of a linear molecule.

19. The method of claim 1, wherein the organophosphorus material (b)(I) comprises a condensation reaction product of two or more molecules according to structure (I) in the form of a linear molecule, selected from the group consisting of a linear condensation reaction product according to structure (X),

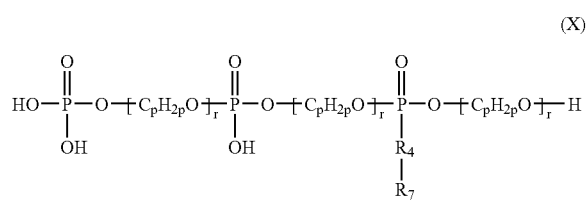
(X)

wherein $R^4$, $R^7$, p, r;
formed by condensation of a molecule according to structure (II)

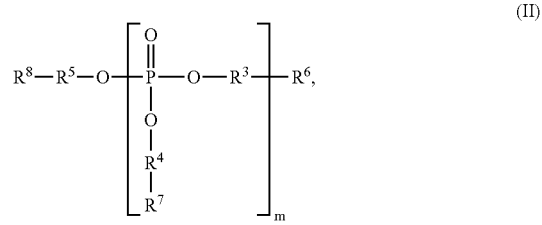
(II)

with a molecule according to structure (V):

(V)

wherein
each p, q is independently integers of from 2 to 5,
each r, s, is independently a number of from 0 to 25, provided that at least one of r and s is not 0, and
t is a number from 1 to 25,
provided that the product of the quantity (r+s) multiplied times t is less than or equal to about 100.

20. The method of claim 1, wherein the organophosphorus material (b)(I) comprises a condensation reaction product of two or more molecules according to structure (I) in the form of a crosslinked network.

21. The method of claim 1, further comprising an aliphatic material.

22. The method of claim 21, wherein the aliphatic material is a surfactant.

23. The method of claim 1, further comprising at least one member selected from the group consisting of a polymer and a surfactant for reducing interfacial tension in an oil well.

24. The method of claim 1, wherein the aqueous fluid consists of:
(a) water or brine and
(b) the organophosphorus material; and
optionally at least one member selected from the group consisting of alcohols, ketones, an aliphatic nonionic additive having an average carbon number from 10 to 24, a long chain aliphatic alcohol having an average carbon number from 10 to 30, polymer, surfactant, clay stabilization material, sand stabilization material, corrosion inhibitors, oxygen scavengers, and bactericides.

25. The method of claim 24, wherein:
the alcohol is selected from the group consisting of isopropyl or butyl alcohol plus methyl alcohol;
the surfactant is an aliphatic anionic surfactant, wherein an aliphatic portion of the aliphatic anionic surfactant has an average carbon number from 10 to 24;
the clay stabilization and sand stabilization materials are selected from the group consisting of epoxy resins, poly (N-acrylamidomethyltrimethyl ammonium chloride) and poly(vinylbenzyltrimethyl ammonium chloride); and
the polymers are selected from the group consisting of biopolysaccharides, cellulose ethers, and acrylamide-derived polymers.

26. The method of claim 1, wherein the aqueous fluid consists of:
(a) water or brine and
(b) the organophosphorus material; and
at least one member of the group consisting of alcohols, ketones, an aliphatic nonionic additive having an average carbon number from 10 to 24, a long chain aliphatic alcohol having an average carbon number from 10 to 30, polymer, surfactant, clay stabilization material, sand stabilization material, corrosion inhibitors, oxygen scavengers, and bactericides.

27. The method of claim 26, wherein:
the alcohol is selected from the group consisting of isopropyl or butyl alcohol plus methyl alcohol;
the surfactant is an aliphatic anionic surfactant, wherein an aliphatic portion of the aliphatic anionic surfactant has an average carbon number from 10 to 24;
the clay stabilization and sand stabilization materials are selected from the group consisting of epoxy resins, poly (N-acrylamidomethyltrimethyl ammonium chloride) and poly(vinylbenzyltrimethyl ammonium chloride); and
the polymers are selected from the group consisting of biopolysaccharides, cellulose ethers, acrylamide-derived polymers.

28. The method of claim 13, wherein r is a number of from 4 to about 25.

29. The method of claim 1, wherein the organophosphorus material is selected from:
(X)(1) organophosphorus compounds according to structure (IX):

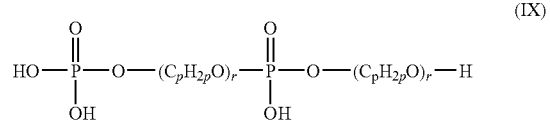

wherein:
p is 2 or 3,
r is a number of from 4 to about 50,
(IX)(2) salts of organophosphorus compounds according to structure (IX), and
(IX)(3) mixtures comprising two or more of the compounds and/or salts of (IX)(1) and (IX)(2).

30. The method of claim 29, wherein r is a number of from 4 to about 25.

* * * * *